Patented Feb. 3, 1953

2,627,483

UNITED STATES PATENT OFFICE 2,627,483

PACKAGING MATERIAL AND METHOD OF MAKING

Laurence E. Dowd, Chicago, Ill., assignor to Transparent Package Company, Chicago, Ill., a corporation of Illinois No Drawing. Application January 30, 1951, Serial No. 208,672

6 Claims. (Cl. 117—145)

This invention relates to coated film material and in particular to the preparation of water resistant, coated, regenerated cellulose film.

This application is a continuation in part of my prior application Serial No. 193,519, filed November 1, 1950.

Regenerated cellulose film, particularly in sheet form, while having a great number of desirable qualities which have contributed to its wide acceptance and usage is not entirely successful as a wrapping or packaging material, for example, where conditions of use are such that it must be, concurrently, moisture proof, stretchable, and unaffected by contact with water.

While moisture proofing of regenerated cellulose film has been achieved to a high degree by the application thereto, of coatings of one kind or another, such coated films do not have as great a stability as is desirable when they are subjected to stretching, contact with water or both. Thus, stretching of such films frequently results in checking of the coating, and contact with water, especially at elevated temperatures results in a loosening separation or sloughing off of the coating from the regenerated cellulose film. Due, therefore, to the diverse usages to which film is put, and due to the frequently unusual and drastic performance requirements involved, there is still lacking a generally all around acceptable moisture proof regenerated cellulose film which for example, would be stable when contacted with wet materials or when immersed in boiling water, or which is subjected to a great amount of stretching as when used in wrapping certain types of articles. Other deficiencies of the coated films of the prior art in this general regard have been the inconvenience and the expense of applying the coating material to the film surfaces, some of the prior art methods involving a plurality of steps and including two or more actual coating operations separated by drying, humidifying, and other treating operations.

Accordingly, an important object of the present invention is the provision of a coated regenerated cellulose film which is substantially moisture proof, which may be subjected to distortion, stretching and the like, without any appreciable loss of such moisture proofness, which is stable in the presence of wet materials, and which does not lose either its unity or its moisture proofness, even after such drastic treatment as immersion in boiling water for extended periods of time.

Another object is the provision of a method for producing a novel coated regenerated cellulose film which is clear, stretchable, moisture proof, and which may be stretched and/or wetted without loss of any substantial part of its moisture proofness.

I have discovered that a film having unusual properties of moisture proofness, stretchability, and cohesion under widely varying conditions may be prepared by applying to a regenerated cellulose film a coating composition comprising a mixture of synthetic unsaturated ester compositions formed by first reacting together bis-phenol and epichlorhydrin and then further reacting the resulting polymeric, polyhydric alcohol with a drying oil fatty acid, admixing a wax, together with such optional materials as dryers, solvents and the like, including accelerators and then applying such a mixture to the surface of the film to be treated, by dipping, spraying or other well known means. In preparing a preferred form of the composite regenerated cellulose film of my invention, a mixture of synthetic unsaturated compositions such as are formed by reacting bis-phenol and epichlorhydrin as set forth in U. S. Patent No. 2,456,408, fatty acids of a drying oil or mixture thereof, such as linseed, soya and the like, a metallic dryer, and a solvent such as mineral spirits or the like, are mixed and heated to about 60 to 90° C. with stirring. To this is added up to about 10% (based on the solids content of the aforesaid mixture) of a waxy material, such as paraffin wax, preferably having a melting point of between 125 to 160° F. There may be concurrently added an accelerator such as mono- or di-tertiary butyl hydroperoxide.

The above mixture is heated with mixing at about 60 to 80° C. for about 10 to 60 minutes and is then applied to the surface of the regenerated cellulose film, preferably hot, as by spraying, brushing, dipping or printing. The thickness of coating may, of course, be varied over a wide range, however, I prefer a thickness which is from about 0.1 to 0.4 mil. After the coating has been applied the coated film is heated to about 80 to 100° C. until the coating has dried to a tack-free condition.

The ester product which is one of the essential ingredients used in preparing my novel composite regenerated cellulose film, while conveniently prepared by reacting drying oils with polyhydric alcohols of bis-phenol and epichlorhydrin, may consist more generally of any higher fatty acid esters of polymeric polyhydric alcohols, which alcohols may be prepared in a manner known to the art from the polyhydric phenols with polyhalo alcohols, epihalohydrins or polyepoxy compounds. The preferred polyhydric alcohol which I have used with great success is a commercially available epichlorhydrin-bis-phenol resin having a melting point of about 95 to 105° C. and equivalent weight of 174. The higher fatty acid containing components of my composition are preferably processed linseed oil fatty acids or processed soya oil fatty acids, and may contain varying amounts of free and combined higher fatty acids in the form of glycerides.

The nature and preparation of the composite regenerated cellulose film of my invention will be illustrated by the following examples.

Example I 54.5 lbs. of commercial processed linseed oil fatty acids is heated with agitation, in a reaction kettle fitted with an agitator to 475° F. Then 36.2 lbs. of epichlorhydrin-bis-phenol resin having a M. P. of about 95° C. and an equivalent weight of 174, is added slowly to the processed linseed oil fatty acids. Agitation is continued until a clear pill is obtained and the acid number of mixture, on a solids basis, is 15 plus or minus 1. At this point 8.0 lbs. of commercial processed tung oil fatty acids is added and the temperature is again raised to 475° F. The mixture is held at this temperature for about one and one-quarter hours or until the acid number of the mixture is about 20. At this point 1.3 lbs. of glycerine is added, and the mixture held at 470° F. until the acid number is about 10 on a solids basis, and the viscosity is H to K (Gardner-Holdt) at 50% non-volatile matter in xylene. At this point the mixture is thinned with xylene and there is added thereto 0.03 lb. of cobalt (as the naphthenate) and 0.01 lb. of calcium (as the naphthenate).

The above mixture is heated with agitation, to about 60° C., and there is added about 5% (based on solids content), of a refined paraffin wax having a M. P. of 125° F., and 1% of mono-tertiary butyl hydroperoxide. Other peroxides which may be used are di-tertiary butyl hydroperoxide and cumene hydroperoxides.

The resulting mixture was dip-coated in some instances and sprayed in others on the outer surface of regenerated cellulose film and the film then heated in a hot air tunnel to about 80° C. and held at this temperature until the coating was dry to the touch. The coating thickness after drying varied from 0.2 to 0.5 mil. Depending on the method of application, either one or both sides of the film can be coated. The regenerated cellulose film used is preferably plasticized film containing plasticizers such as glycerol, other polyhydroxy alcohols and the like, and made in accordance with procedures well known in the art.

Example II 746 grams of processed linseed oil fatty acids was heated as in Example I, and there was added thereto 504 grams of epichlorhydrin-bis-phenol resin having a melting point of 105° C. and an equivalent weight of about 174. Agitation of the mixture was continued until the clear pill stage. When the acid number was about 15, 10 grams of glycerine was then added. When the viscosity was H to K (Gardner-Holdt) at 50% nonvolatile matter in xylene, there was added 0.03 gram of cobalt as naphthenate and 0.01 gram of calcium as naphthenate.

The resulting mixture, after filtration was heated to 70° C. and 10% (based on solids content of the mixture) of 140° F. M. P. refined paraffin wax was added. There was concurrently added 1% of mono-tertiary butyl hydroperoxide.

This mixture was applied by dip-coating in some instances and spraying in others, on a regenerated cellulose film, the coated film then being air dried at 90° C. until tack-free.

A film coated on one side and prepared in the above examples may be wetted and stretched as much as 50% or more without the loss of any substantial amount of its moisture proofness, and furthermore, will be found to be free of cracking or peeling or any other separation of the coating from the surface of the film. Furthermore, I have found that such a treated film may be immersed in boiling water for as long as three hours or more without any separation or even loosening of a coating from the base. This is truly an astonishing and unexpected attribute of my coated film and contributes markedly to its utility. Furthermore, meat items wrapped in such film have been kept at —22° F. for extended periods, without the films cracking or peeling even when roughly handled.

So far as I am aware, no other type of moisture proof film, whether treated by waxing, lacquering, varnishing or combination thereof, according to the prior art, will provide a film material having the unique and very desirable properties such as are exhibited by the coated film of my invention.

It is to be understood of course that the treated film of my invention may be further modified by applying additional coatings thereto, such as for example, heat sealing lacquers, light barrier components, dyes, lacquers containing additional moisture proofing waxy materials, and the like. Opacifiers, such as titanium dioxide, and pigments may be added to one or more of these coating mixtures.

The regenerated cellulose coated film material of my invention thus combines to a hitherto unobtainable degree the unique properties hereinbefore set forth, which set it apart from and above the present commercially available so-called moisture proof films, as well as those of the prior art.

While my invention has been described as embodied in certain preferred forms and aspects, it is to be understood that these are illustrative only, that modifications thereof, will readily occur to those skilled in the art.

I claim:

1. A transparent moisture proof film comprising a regenerated cellulose sheet having bonded to the surfaces thereof a resinous coating containing a polymerized mixture comprising drying oil fatty acid esters of the reaction product of epichlorhydrin and bis-phenol and up to about 10%, based on the solids, of a waxy material.

2. A transparent moisture proof film comprising a regenerated cellulose sheet having bonded to the surfaces thereof a thin resinous continuous coating comprising polymerized drying oil fatty acid esters of a polymeric polyhydric alcohol, and up to about 10%, based on the solids, of a waxy material.

3. A transparent moisture proof film comprising a regenerated cellulose base coated with a continuous thin resinous film by applying to the surface of said base a liquid mixture comprising drying oil fatty acid esters of a polymeric polyhydric alcohol, glycerol, a metallic dryer for said esters, a hydroperoxide accelerator, and up to about 10%, based on the solids, of a paraffin wax, and then heating the thus treated base.

4. A substantially stretchable moisture and moisture-vapor resistant sheet comprising a regenerated cellulose film having bonded to the surfaces thereof a thin resinous coating comprising a polymerized mixture of drying oil fatty acid esters of the reaction product of a polyhydric phenol and a member of the group consisting of polyhaloalcohols, epihalohydrins and polyepoxy compounds, and up to about 10%, based on the solids, of a waxy material.

5. A transparent moisture proof film comprising a regenerated cellulose sheet having bonded to one surface thereof a resinous coating containing a mixture comprising drying oil fatty acid esters of the reaction product of epichlorhydrin and bis-phenol and up to about 10%, based on the solids, of a waxy material.

6. A method of preparing a water proof wrapping medium which comprises applying to a surface of a plasticized regenerated cellulose sheet a thin coating of a mixture comprising drying oil fatty acid esters of the reaction product of epichlorhydrin and bis-phenol and up to about 10%, based on the solids, of a waxy material, and heating the thus coated film until substantially tack-free.

LAURENCE E. DOWD.

REFERENCES CITED

The following references are of record in the file of this patent:

UNITED STATES PATENTS

| Number | Name | Date |
|---|---|---|
| 2,022,490 | Charch | Nov. 26, 1935 |
| 2,301,959 | Lanning | Nov. 17, 1942 |
| 2,456,408 | Greenlee | Dec. 14, 1948 |
| 2,512,996 | Bixler | June 27, 1950 |
| 2,573,957 | Daniel et al. | Nov. 6, 1951 |